United States Patent [19]

Van Loo et al.

[11] Patent Number: 5,660,872
[45] Date of Patent: Aug. 26, 1997

[54] METHOD FOR SEPARATING A POLYDISPERSED SACCHARIDE COMPOSITION, RESULTING PRODUCTS AND USE THEREOF IN FOOD COMPOSITIONS

[75] Inventors: Jan Van Loo, Oud Heverlee; Karl Booten; Georges Smits, both of Brussels, all of Belgium

[73] Assignee: Raffinerie Tirlemontoise, S.A., Belgium

[21] Appl. No.: 436,418

[22] PCT Filed: Nov. 24, 1993

[86] PCT No.: PCT/BE93/00072

§ 371 Date: Sep. 21, 1995

§ 102(e) Date: Sep. 21, 1995

[87] PCT Pub. No.: WO94/12541

PCT Pub. Date: Jun. 9, 1994

[30] Foreign Application Priority Data

Nov. 24, 1992 [BE] Belgium .................................. 9201021

[51] Int. Cl.⁶ ................................................. A23L 1/307
[52] U.S. Cl. ....................... 426/658; 426/573; 210/656; 536/124; 536/128
[58] Field of Search ............................ 426/658, 573–579

[56] References Cited

U.S. PATENT DOCUMENTS

| | | | |
|---|---|---|---|
| 4,758,515 | 7/1988 | Bärwald et al. | 435/99 |
| 4,871,574 | 10/1989 | Yamazaki | 426/471 |
| 4,936,902 | 6/1990 | Hatzidimitriu | 204/182.3 |
| 4,950,332 | 8/1990 | Stringfield et al. | 127/55 |
| 5,169,671 | 12/1992 | Harada | 426/590 |
| 5,227,556 | 7/1993 | Frippiat et al. | 426/573 |
| 5,525,368 | 6/1996 | Rha | 426/658 |
| 5,543,162 | 8/1996 | Timonen | 426/658 |
| 5,569,483 | 10/1996 | Timonen | 426/658 |

FOREIGN PATENT DOCUMENTS

| | | |
|---|---|---|
| 37016 | 11/1985 | Hungary . |
| 61-177602 | 7/1986 | Japan . |

OTHER PUBLICATIONS

Labourel 1969 Chem Zvesti 23(10) 765–9.

*Primary Examiner*—Carolyn Paden
*Attorney, Agent, or Firm*—Hayes, Soloway, Hennessey, Grossman & Hage, P.C.

[57] ABSTRACT

A method for chromatographically separating a polydispersed saccharide composition, wherein said composition is fed into a chromatography column in a metastable state. A low molecular weight saccharide-free polydispersed saccharide composition and its use in foodstuffs or preparations for producing same, are also disclosed.

22 Claims, 4 Drawing Sheets

METHOD FOR SEPARATING A POLYDISPERSED SACCHARIDE COMPOSITION, RESULTING PRODUCTS AND USE THEREOF IN FOOD COMPOSITIONS

SUBJECT OF THE INVENTION

The invention relates to a new process for the chromatographic separation of a polydispersed composition of saccharides such as inulin, levan, dextran, starch, pectin and/or a mixture thereof, as well as to a poly-dispersed composition of saccharides free of low molecular weight saccharides and to its use in food products or preparations intended for the manufacture of food products.

Technological Background Forming the Basis of the Invention

The modification of food requirements is linked to our current way of life which is characterized by greater sedentary and the disappearance of intense physical work.

We therefore need a smaller amount of high energy diet, (characterized by a high lipid and carbohydrate content and the like), a greater supply of high fiber foods which promote the development of a healthy intestinal flora and, advantageously, this diet is not very cariogenic.

In the context of a balanced diet, there is therefore a great need for food compositions corresponding to the following requirements:
—reduced calorie content
—reduced fat content
—high fiber content
—favorable effect on the intestinal flora
—reduced sugar content
—less cariogenic In addition to these quantitative requirements, the food compositions should also satisfy qualitative requirements in the sense that their organoleptic qualities (appearance, texture) cannot in any case be inferior to traditional foods.

By virtue of their reduced sugar content, these food compositions are particularly suitable for diabetics.

Fructans having an average degree of polymerization, which is equal to or greater than 20, such as inulin, can meet these requirements.

In this context, the product Raftiline® was developed and marketed by Raffinerie Tirlemontoise.

Raftiline® contains inulin, a substance which is easily available, obtained from numerous plants which are widely distributed, more specifically in the case of Raftiline® from *Cichorium intybus*.

Inulin is a polydispersed composition of saccharides of formula GFn (G=glucose, F=Fructose, n varying from 2 to 60), whose fructose units are linked to each other by a β bond (2→1).

The degree of polymerization (DP=n+1) has a direct influence on the solubility of inulin, an important parameter in certain food preparations.

The degree of polymerization varies according to the conditions for harvesting chicory roots. By harvesting the chicory roots at the beginning of October, the inulin obtained is characterized by a high percentage of long GFn chains. The later the harvest date, the shorter the GFn chains.

As regards the composition of Raftiline®, 60% of the dry matter is composed of molecules whose degree of polymerization is less than 20.

In addition to inulin (saccharides whose degree of polymerization is greater than 2), which represents more than 92% of the dry matter, Raftiline® also contains glucose and fructose (2% of dry matter) as well as sucrose (6% of dry matter).

Raftiline® is characterized by a slightly sweet taste (10% of that of sucrose) without aftertaste and by a neutral odor.

Raftiline® is a product which is very sparingly soluble: it is only at a temperature greater than 85° C. that Raftiline® is completely dissolved. A 10% solution already precipitates at 20° C. and this precipitation accelerates and becomes increasingly complete as the temperature decreases.

In contrast, Raftiline® becomes more soluble in hot water. Thus, the solubility is of the order of 30% at a temperature of 80° C. and of the order of 40% at a temperature of 90°–95° C. Under these conditions, the pH of the aqueous medium becomes very important.

When it is too acidic (pH of less than 4.5), Raftiline® is partially hydrolyzed to its constituent monomers. Furthermore, there is a risk of the solution becoming easily recolored when the pH is too high (pH greater than 5.5).

It is also known that at high concentrations, Raftiline® crystallizes very rapidly as soon as the temperature decreases below 65° C.

Raftiline® has a number of advantageous properties which allow the requirements of a balanced diet, as stated above, to be satisfied.

Numerous studies in vivo and in vitro in man and animals have shown that inulin is practically not hydrolyzed during its passage through the buccal cavity, the stomach and the small intestine. The only calorie contribution for the host would be due to the fermentation products (in the colon) namely, volatile fatty acids. These are partially absorbed in the colon and may give rise to some calorie supply for the host.

This route is however distinctly less efficient than in the case where carbohydrates are absorbed in the small intestine and metabolized in the liver. Raftiline® is therefore a product with a low calorific value, the value being equal to or less than 1 Kcal/g.

Raftiline® is a food fiber by definition since it is not decomposed by the enzymes specific to the human body and since acid hydrolysis in the stomach is negligible. It also has the beneficial nutritional effects of fibers, namely: an increase in the fecal mass, a decrease in the transit time, a decrease in constipation, a decrease in blood lipids and in cholesterol, a decrease in intestinal pH, and the like.

Raftiline® has a specific effect of promoting Bifidobacteria and lactic acid bacteria and inhibits the development of putrefactive bacteria.

However, the presence in a polydispersed composition of saccharides such as Raftiline®, of about 8% mono- and disaccharides as well as oligosaccharides with a low degree of polymerization penalizes the nutritional effects of Raftiline® and prevents its use in certain food compositions. The presence of saccharides of low molecular weight (with a low degree of polymerization) in Raftiline® also causes cariogenicity of the product.

These saccharides also give the sweet taste to Raftiline®, even if the sweetening power is only 10% of that of sucrose.

Because of this, the use of the product is practically excluded in certain food preparations such as for example those based on meat.

The presence of low molecular weight saccharides also causes drawbacks as to the tolerance of Raftiline® during digestion. Tolerance is measured as sensations of distention and intestinal pressure.

The sensation of distention is a known phenomenon which is often observed during ingestion of certain vegetables such as for example cauliflower. Tolerance is the consequence of two phenomena, one being the osmotic effect, due to an increased presence of water in the colon, the other being the fermentation effect caused by fermentation products, essentially volatile fatty acids and gases.

It has been observed that these two effects are amplified by the presence of low molecular weight molecules in the colon.

Numerous studies have shown that inulin does not cause an increase in blood glucose in diabetics.

However, the presence of monosaccharides and disaccharides in Raftiline® forbids, in practically all countries, the description of foods containing Raftiline® as "diabetic foods".

Prior State of the Art

Processes for the separation of polydispersed compositions of saccharides have already been developed in order to obtain polydispersed compositions of saccharides free of low molecular weight sugars.

Methods using techniques directly resulting from the physical properties of polydispersed compositions of saccharides, in particular of inulin, consist in a separation by precipitation either at cold temperature, or with the aid of solvents. In these processes, the difference in the solubility of the low molecular weight fractions and of the high molecular weight fractions is exploited.

These methods are described in patents PN SU-685290, SU-487118, SU 1,214,104, J 60255802.

Variants which claim to increase the yield of these precipitations are also described.

Other patents (SU 487118, BE 889950, J 61280291, J 03281601, U.S. Pat. No. 437,602) propose using a separation of the molecules according to their molecular weight, by means of a technique using membranes, either ultrafiltration or dialysis membranes, by precisely controlling defined parameters (required pore size, operational pressure, temperature and the like).

However, none of these processes has been used industrially, except for the manufacture of small quantities of products for medical applications, at very high prices, and therefore not usable in the food industry.

Between the two wars, in Germany, pilot scale trials for the extraction of inulin from chicory root were completed, in which a purification method (including a carbonation and a final defecation with the aid of high metal salts) had been optimized.

The final phase of the preparation of edible inulin consisted of a cold precipitation. Although actions were undertaken to convert sugar refineries in Germany, this manufacturing process has never been applied on a large scale for economic reasons.

A chromatographic separation on an industrial scale has not yet been envisaged because of the basic incompatibility of the physical properties of inulin (low solubility in aqueous medium) and the technological requirements of the products which can be treated by an industrial chromatographic separation process, such as those used for example in the production of HFCS, extremely pure fructose and dextrose syrups or in the production of a syrup containing more than 95% of β(2->1)-fructans on the basis of 1-kestose (neosugar P).

Indeed, all these products are characterized by an extremely high solubility, as regards both the starting materials and the finished products (Hervé and Lancrenon, 1988, Shioda, 1990; Hashimoto et al., 1983, Kishihara et al.; Carta and Byers, 1989, Howard and Carta, 1988, Bridges and Barker, 1992, Kim et al. 1992), which allows them to be easily separated into different fractions according to their degree of polymerization.

In the Roquette frères patent (FR 2,618,161), the separation between components with a high degree of polymerization and the mono- and disaccharides in an inulin hydrolyzate is easy to carry out because the starting material as well as the products obtained are perfectly soluble. Indeed, the level of components with a high degree of polymerization in the hydrolyzates is so low that the problem of precipitation or of insolubility does not occur.

Aims of the Invention

The present invention is intended to develop a process for the chromatographic separation of a polydispersed composition of saccharides which makes it possible to obtain a polydispersed composition of saccharides free of low molecular weight saccharides, in particular free of saccharides whose degree of polymerization is less than or equal to 2, preferably of less than or equal to 5.

The present invention is intended in particular to develop a chromatographic separation process which can be used industrially.

Another aim of the present invention is to obtain a polydispersed composition of saccharides which tastes less sweet, which is less cariogenic or which is non-cariogenic, and which does not cause problems of acceptability during digestion.

An additional aim of the present invention is intended to obtain a polydispersed composition of saccharides which is also not very high in calories, which has a food fiber effect and a beneficial effect on the intestinal flora, in particular a Bifidobacteria- and lactobacteria-promoting effect and an inhibition of the development of putrefactive bacteria.

An additional aim of the present invention is intended to obtain, from a polydispersed composition of saccharides, a low molecular weight saccharide composition free of high molecular weight saccharides, in particular free of saccharides whose degree of polymerization is greater than 5. The invention is also intended to obtain a low molecular weight saccharide composition free of mono- and disaccharides.

The invention is also intended to obtain a composition with a creamy structure, containing the said polydispersed composition, preferably free of low molecular weight saccharides, which has improved organoleptic properties and which can be incorporated into food products or preparations intended for the manufacture of food products.

Characteristic Features of the Invention

The invention relates to a new process for the chromatographic separation of a polydispersed composition of saccharides, such as Raftiline®, inulin, levan, dextran, starch, pectin and/or a mixture thereof in which the said polydispersed composition of saccharides is introduced into a chromatographic column in a metastable state.

A polydispersed composition of saccharides is in a metastable state when, after having been dissolved in an aqueous solution at high temperature (>85° C. for 10 minutes for inulin), it is adjusted to a temperature less than the solubilization temperature without agglomerating.

Unexpectedly, it has been observed that it is possible to chromatographically separate, according to their degree of polymerization, the saccharides contained in the said polydispersed composition, when the latter is in a metastable state.

Advantageously, prior to the chromatographic separation, the composition is dissolved by subjecting it, at a temperature of between 85° and 150° C., to the action of ultrasound and/or to high shear forces.

This preliminary action facilitates the chromatographic separation and, by breaking the tertiary structure of the saccharides, makes it possible to release the low molecular weight sugars (monosaccharides, disaccharides and oligosaccharides) and the ions trapped in this structure.

In the separation process according to the invention, the composition is advantageously eluted with water having a temperature of between 5° and 95° C., preferably of between 45° and 95° C., in a particularly preferred manner of between 65° and 75° C., having a conductivity of between 1 µS and 100 mS, preferably of between 10 and 250 µS, and a pH of between 4 and 8, preferably of between 5.5 and 7, in a chromatographic column containing cationic resins or zeolites.

Advantageously, the grains of the cationic resins of the chromatographic column are of between 100 µm and 2 mm, preferably of between 100 µm and 500 µm.

The invention also relates to a polydispersed composition of saccharides having a distribution of the degree of polymerization which is modified because of the fact that the low molecular weight saccharides (or saccharides with a low degree of polymerization) are separated and removed from the said composition.

Preferably, the invention relates to a new polydispersed composition of saccharides which is free of saccharides with a degree of polymerization of less than or equal to 2, preferably of less than or equal to 5. In particular, an inulin composition which is free of monosaccharides and disaccharides, advantageously free of saccharides with a degree of polymerization of less than or equal to 5.

The invention also relates to a polydispersed composition of saccharides free of saccharides with a degree of polymerization greater than 5 and which is obtained by the process of the invention.

Preferably, the said composition is also free of saccharides with a degree of polymerization of less than or equal to 2. The latter composition can especially be obtained by applying the process of the invention to the preceding composition separated from saccharides with a DP>5.

Another aspect of the invention relates to a composition having a creamy structure and comprising a polydispersed composition of saccharides according to the invention and a liquid, such as water, milk, egg white, egg yolk or sugar syrup. The said polydispersed composition being the essential element for the formation of the said creamy structure.

Preferably, the concentration of the polydispersed composition of saccharides in the composition having a creamy structure according to the invention varies from 5 to 85%.

In addition, the composition having a creamy structure according to the invention may comprise a fat substitute, a thickening agent, a gelling agent, a stabilizer, a dispersant and/or a component which influences the dissolution and the dispersion of the saccharide or of the mixture of saccharides and/or reduces the agglomeration of the composition during reconstitution after drying the composition. Preferably, this component is chosen from the group consisting of carbohydrates, salts, proteins, gums, preferably xanthan, carob or guar gums, carboxymethyl cellulose, carrageenans, alginates, fats or a mixture thereof.

Preferably, the composition having a creamy structure according to the invention is prepared from dried or codried components or is directly dried.

The invention also relates to a food product or a preparation for the manufacture of a food product which comprises a composition according to the invention as well as customary food components.

Preferably, it is a food product with a low fat level or which is free of fat, or a preparation intended for the manufacture of the said food product which comprises a composition according to the invention as partial or total fat substitute.

The invention also relates to a food product, such as a chocolate which is suitable for consumption in hot countries, comprising a higher percentage of water or a preparation intended for the manufacture of the said food product, characterized in that it comprises, in addition to the customary food components, the polydispersed composition of saccharides which is free of saccharides with a degree of polymerization of less than or equal to 2, preferably of less than or equal to 5 according to the invention.

A final aspect of the invention relates to their use of the composition according to the invention, in the form of a food product or of a preparation intended for the manufacture of a food product for humans or animals, including food for dogs, cats and the like, as well as the use of the composition according to the invention in the form of a fat or oil substitute or of a carbohydrate substitute or of a stabilizer.

The invention also relates to the use of the composition according to the invention so as to incorporate a greater quantity of water into a food product such as chocolate or into a preparation intended for the manufacture of such a food product.

The invention will be described in greater detail by a preferred embodiment of the invention by means of the accompanying figures in which:

FIGS. 1 and 2 represent the modifications of the state of an aqueous inulin solution at 30% dry matter content according to the temperature;

FIG. 3 schematically represents the operation of the IWT (Illinois Water Treatment) system for the separation of saccharide fractions according to their degree of polymerization;

FIGS. 4 and 5 represent telemetric measurements of the variation of the interdental pH as a function of the time recorded on a volunteer having consumed a poly-dispersed solution of saccharides according to the invention and a solution of pure sucrose.

DESCRIPTION OF A PREFERRED EMBODIMENT OF THE INVENTION

Inulin freed of its mono-, di- and oligosaccharides with a low degree of polymerization (called Raftiline LS®) is produced from purified inulin with a conductivity of 1 µs to 1 mS (solution at 15% dry matter content) or from a crude inulin extract with a conductivity of 1 mS to 20 mS (solution at 15% dry matter content). Inulin can be extracted from inulin-containing plants, which may be edible or nonedible plants which can be genetically modified beforehand so as to produce more inulin. For example, the inulin may be extracted from chicory, Jerusalem artichoke, dahlia, *Inula helenium* roots, or *Arctium lappa* roots, Ti plant, artichoke, garlic, *Urginea maritima* or may be of microbial origin (e.g. Streptococcus mutans).

In order to be able to carry out the chromatographic separation of inulin, it should be either completely dissolved at a concentration of 1% to 50% of dry matter content, preferably of 20 to 40% of dry matter content.

Inulin is a β(2->1) fructan, having a helical tertiary structure (according to Eigner et al., Physiological characterization of inulin and sinistrin, Carbohydrate Research (1988) 180, 87–95) which makes the complete solution of inulin difficult.

As long as this tertiary structure is not broken, physico-chemical separation on chromatographic resins cannot, by definition, be carried out. Furthermore, this tertiary structure can trap other molecules (mono-, di-, oligosaccharides) and ions, which in the final analysis also prevent the separation process from taking place.

This tertiary structure can be broken by subjecting inulin either to high temperatures, or to the action of ultrasound, or to high shear forces.

It has been experimentally observed that inulin dissolves (A) completely at a temperature which should be at least 85° C., and this with a contact time of 10 min. The more the temperature increases, the more the contact time can be reduced. Inulin can thus also be completely solubilized by combining a contact time of 10 to 60 seconds with a temperature of 130° C.

It has been experimentally observed that inulin dissolved according to the abovementioned techniques is in a metastable state (B). When inulin thus completely dissolved is adjusted to a temperature which is less than the minimum solubilization temperature, the product does not agglomerate immediately.

A hysteresis effect was observed during reagglomeration (C). During this hysteresis period, the inulin solution is in a metastable state (B). This hysteresis effect will be all the more pronounced, (it will be possible to maintain the inulin solution all the longer in this metastable state), as the dry matter content of the solution is reduced and as the temperature approaches the minimum solubilization temperature (85° C.).

Figure 2:
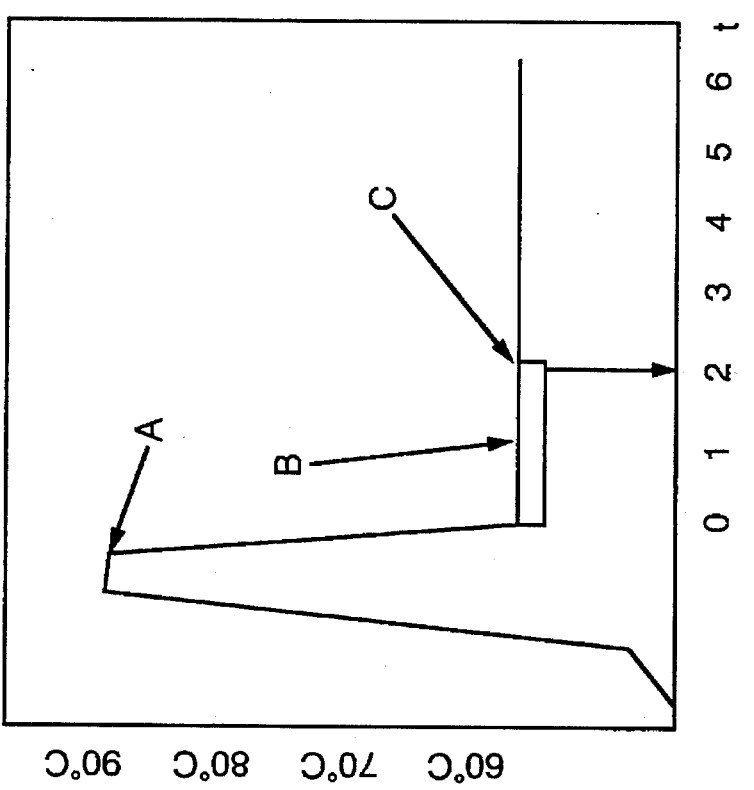
Figure 1:
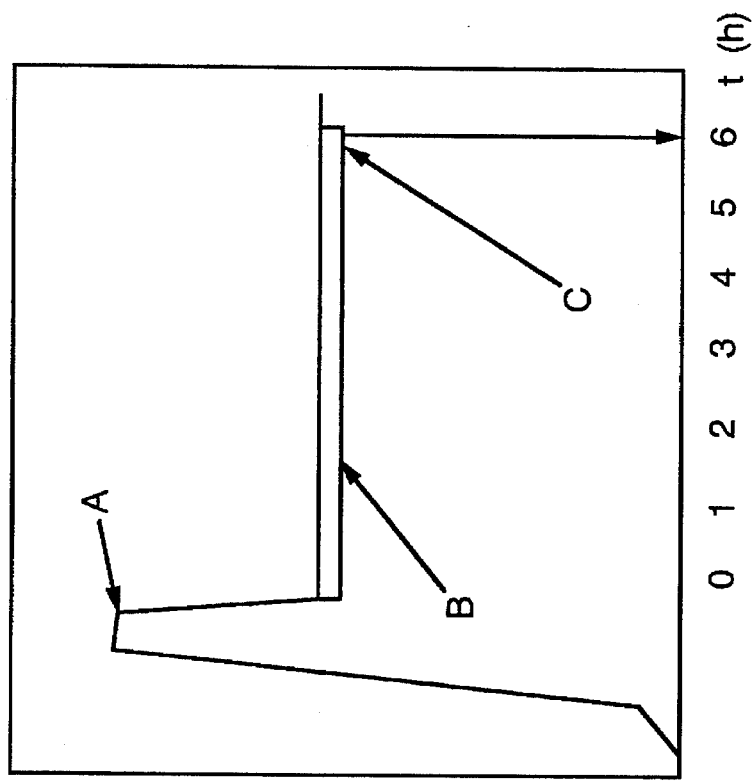

Thus, for example, an inulin solution at 30% dry matter content can be maintained in this metastable state for at least 2 hours at a temperature of 60° C. (FIG. 1) or for at least 6 hours at a temperature of 75° C. (FIG. 2).

It is important to note that when the inulin solution is preserved for too long at high temperatures, a chemical degradation can occur with, as consequence, a recoloration, a hydrolysis, the formation of low molecular weight oligosaccharides such as difructose dianhydride, a caramelization. These reactions are for the most part controlled by the pH. Maintaining the inulin solution for at most 2 hours at a temperature of 60°–70° C. and at a pH of 5.0–5.5 avoids these problems.

Continuous stirring is necessary to maintain a very homogeneous temperature in order to avoid the formation of crystal seeds in less hot zones and to maintain a homogeneous pH.

The inulin solution thus conditioned is then transferred to an industrial chromatography system. It may be a system of the "batch" type or of the "continuous" type or of the "semicontinuous" type. The batch system comprises one or more chromatographic columns having an inner diameter of 5 cm to 10 m, onto which a certain quantity of inulin solution is applied, which is then eluted with hot demineralized or non-demineralized water having a temperature of between 5° C. and 95° C., preferably of between 45° C. and 95° C., in a particularly preferred manner of between 65° C. and 75° C., a conductivity of between 1 μS and 100 mS, preferably of between 10 and 250 μS and a pH of 4 to 8, preferably of 5.5 to 7. The "continuous" system comprises all chromatographic systems having a diameter of 5 cm to 10 m, operating according to the simulated moving bed principle, as constructed for example by IWT (Illinois Water Treatment), UOP (United Oil and Petroleum), Mitsubishi, Finn Sugar, Amalgamated sugar and the like, or so-called annular chromatographic systems (as described by G. Carta's team, Univ. of Virginia, Charlottesville), also functioning according to the principle of the simulated moving bed and which are interconnected as described by P. E. Barker (Univ. of Aston in Birmingham).

The separation itself is determined by the nature of the column packing. The separation of sugars with a low degree of polymerization from sugars with a higher degree of polymerization can be carried out with cationic resins, preferably of the chromatographic type, whose grain diameter may be situated between 10 μm and 2 mm, preferably between 100 μm and 500 μm, and which were prepared in the calcium or potassium or sodium form, preferably in the potassium form (e.g. Dowex 50W-X8, KORELA VO7C, SM-47, SM-48, SM-49, SM-50 Diaion UBK-530 and the like). The separation can be equally well carried out with zeolites (e.g. Y zeolite of Toyo Soda Mfg.).

Thus, it is possible to obtain, using the appropriate operational parameters, on the one hand, a product which contains practically no more (from 0% to 1% on a dry matter basis) mono- and disaccharides, and which contains less or practically no more tri-, tetra- and pentasaccharides compared with the starting inulin, and on the other hand, a product containing the mono-, di-, tri-, tetra- and pentasaccharides and a small quantity or practically no more oligosaccharides with a degree of polymerization 3 to 60, normally with a degree of polymerization 3 to 20, is obtained.

By varying the abovementioned production parameters it is possible to obtain products characterized by a different spectrum of mono-, di- and oligosaccharides with a low degree of polymerization.

The nutritional and technological properties as well as examples of production and the applications described below refer to the product called Raftiline LS® obtained according to the separation process of the invention.

Nutritional Properties

Inulin no longer containing, or practically no longer containing mono-, di- and oligosaccharides with a low degree of polymerization, exhibits modified nutritional properties. Compared with the original inulin, it is less cariogenic because it contains considerably fewer sugars which are easily fermentable by the buccal microbial flora, which results in a lower production of lactic acid, which is the direct cause of dental caries.

Inulin freed of its mono-, di- and oligo-saccharides with a low degree of polymerization, is also less high in calories, because these are the particular components which are directly absorbed into the blood in the small intestine, and which therefore contain an energy value of 4 Kcal/g. The inulin characterized by β(2→1) fructan bonds is not hydrolyzed by human intestinal enzymes. It therefore quantitatively enters into the cecum and the colon, where it is completely fermented and where it is partially converted into volatile fatty acids (VFA) which are the final carriers of the energy of inulin. They contain less metabolic energy. By removing the fraction with a low degree of polymerization from the original inulin, the ratio of low calorie substrates became higher, resulting in less calories per gram of dry matter content of the treated inulin.

Because of the absence of mono-, di- and oligosaccharides with a low degree of polymerization, there is no longer any nutritional obstacle to designating foods containing the product of the present invention as "diabetic foods".

Technological Properties

The applications of Raftiline LS® are based on its unsweet taste without aftertaste, its neutral odor, its moderate solubility, its contribution to the texture and to the taste, its gelling capacity, the enhancement of the stability of foams and emulsions and its reducing power which is practically equal to zero (DE<1).

The sweetening power of Raftiline ST® is 10% compared to that of sugar (sucrose). The determination of the sweetening power is made with the aid of a tasting panel which indicates from which sugar concentration there is no longer any difference in sweetening power compared to an inulin solution of known concentration (1% aqueous sugar solution, 10% aqueous inulin solution, pH as such and room temperature). The sweetening power of Raftiline LS® cannot be determined by using the same method given that the difference in sweetening power is too high to be able to prepare a solution or another food having the same consistency or sweetening power allowing the comparison. Only a theoretical sweetening power can be calculated starting with a Raftiline ST® (containing 6% sucrose, 1% fructose and 1% glucose) which gives, for Raftiline LS®, a theoretical value of about 2% relative to the sugar, which is practically undetectable during the tasting.

The viscosity of Raftiline LS® solutions is very similar to that of Raftiline ST® solutions. At 10° C., the viscosity of 5%, 10% and 20% solutions is 0.4, 2.0 and 4.0 mPa·s respectively.

The reducing power of Raftiline LS® is practically equal to zero, which excludes any Maillard reaction in relation to Raftiline ST® whose DE=2.

Raftiline LS® is stable in applications whose pH is greater than 4.5. At lower pH values, the stability is a function of the dry matter content of the final product, of the storage and of the temperature.

The hydrolysis is limited to less than 10% when:

| | |
|---|---|
| the pH ≧ 4 | (baked products, milk desserts, ice-creams, chocolate and the like) |
| the pH < 4 | and the temperature ≦ 10° C. (sherbets, yoghurt, fromage frais and the like) |
| the pH < 4 | and the dry matter content ≧ 70%) confectionery, fruit preparations and the like). |

The invention also relates to a composition having a creamy structure as described in Patent Application PCT/BE92/00042 and prepared with Raftiline LS® according to the invention and prepared according to the processes described in this patent application.

Such a composition offers advantages relative to the simple addition of Raftiline LS® to food products, such as a fattier and creamier taste, a softer texture, a more brilliant and viscous appearance and a better taste without aftertaste. During assessment, by a taste panel, of food products prepared with cream according to the invention, no sensation of dryness in the mouth was observed.

The appearance and the consistency of the creamy structure can vary highly, for example between the appearance and the consistency of a "dressing" type sauce (very viscous liquid) to the appearance and the consistency of margarine or "Nivea® cream", and even up to the harder cold butter form, and this regardless of the physicochemical structure of the cream (e.g. of the gel, dispersion or emulsion type, or a combination of these different structures).

In addition, it is possible to influence the solubility of Raftiline LS® according to the invention by adding other substances such as salts, carbohydrates (for example sucrose), proteins, gums such as xanthan gums, catch gums, guar gums, carboxymethyl cellulose, carrageenans, alginates, fats, and/or a mixture thereof, to the mixture of Raftiline LS® and water or milk or egg white or egg yolk or sugar syrup.

In addition, such substances also make it possible to prevent the agglomeration of the particles of the composition according to the invention when the latter is dried.

Indeed, during the drying of the composition according to the invention, an agglomeration of the particles (probably due to the formation of new hydrogen bonds) occurs, and when the composition is redispersed in a liquid medium, a new energy expenditure is necessary to break these hydrogen bonds and to reform a composition with a creamy stable and homogeneous structure.

These substances can he added to the composition according to the invention, in the form of a dry powder (insofar as the composition according to the invention is sufficiently liquid to hydrate the substance added to the composition), in the form of a concentrated solution or in the form of an aqueous pasty structure.

As can be observed in the preceding paragraphs, by modifying the various parameters which influence the solubility of the polydispersed composition of saccharides according to the invention and consequently its ability to form a cream, it is possible to prepare a full range of creams with widely variable Raftiline LS® concentrations varying from 5 to 85% or more.

It is also possible to use other polydispersed compositions of saccharides such as, for example, levan, dextran, starch, pectin and/or a mixture thereof.

In accordance with another embodiment of the invention, the compositions according to the invention are used as fat and/or oil substitutes in food products. The replacement of triglycerides with compositions according to the invention can be made proportionally with an identical quantity of the cream compositions and triglycerides, that is to say on the basis of a "one for one" substitution per weight. Moreover, mixtures of a composition according to the invention with other fat substitutes mentioned above, or with thickening or gelling agents, or with stabilizers or dispersants, can also be used to partially or completely replace triglycerides in food products. In the case of food compositions in which eggs or emulsifiers containing glycerides are used, small quantities of fats are always present. In this case, only food products "virtually free of fats" can be obtained.

This can be done by adding the cream composition according to the invention to the food products or by producing the cream in situ by applying a high shear to the mixture of the different components which constitute the food product. The latter method can only be applied if the concentration of Raftiline LS® and of other components of the final food product is sufficiently high to produce a cream. Raftiline LS® can be added to food products in the form of a powder or in solution but, as mentioned above, these procedures have very serious limitations: the low solubility of Raftiline LS® does not make it possible to add large quantities of Raftiline LS® in the form of a solution, while the addition of inulin powder, as such, generally modifies the organoleptic properties of the food products obtained (a sandy texture can be observed for example).

It was also observed that the cream compositions according to the invention can be used effectively and easily as stabilizers and anti-syneretic agents in various products, food emulsions and mousses, especially in dairy products, salad dressings, mousses and the like. In this case, a smaller quantity of Raftiline LS® is necessary in the form of a cream in order to obtain a stabilizing effect comparable, or even superior, to that obtained with the inulin powder. In yoghurt, for example, prepared with 10% cream containing 50% Raftiline LS®, the whey does not separate, even after a long period of preservation, whereas the use of 10% Raftiline LS® powder can still not prevent the separation of yoghurt into two layers.

Moreover, it was also observed that the cream compositions according to the invention can be used to incorporate water into food products, such as chocolate which can thus contain a greater percentage of water. The chocolate thus produced has a higher melting point and is therefore more suitable for consumption in warmer countries. Other compositions, capable of retaining water in a stable form, may also be suitable for the preparation of this type of chocolate.

The use of cream compositions according to the invention is particularly advantageous from the nutritional point of view since it combines a good food fiber effect and the promotion of the proliferation of the intestinal flora useful for reducing fat ingestion and for decreasing the cholesterol level in the body.

Raftiline LS® in dry form or in creamy form is preferably used as a filling agent and fat and/or sugar substitute in noncariogenic sugar-free products and in unsweetened products for which a sweet taste is not desirable.

Sugar free applications, without cariogenicity, are for example chocolate, confectionery, chewing gum and the like. Applications in which a sweet taste should be avoided are for example meat products, cream spreads, cheese, sauces and soups, salty snacks, chocolate and the like.

In general, Raftiline LS® may be used in confectionery, fruit preparations, milk desserts, yoghurts, fromage frais, oven baked cakes, ice cream, sherbets, meat products, sauces, soups and the like.

The invention will be described in greater detail in the following examples given solely by way of non-limiting illustrations of the subject of the invention.

Example I

An inulin solution at 30% dry matter content is prepared from a refined chicory inulin powder (Raftiline®). The powder from the company Raffinerie Tirlemontoise is suspended in hot water at 60° C. and is then passed through an APV sterilizer so as to maintain it for 2 min at a temperature of 137° C., after which it is immediately cooled to a temperature of 65° C. This treatment has a double function: sterilization of the product and maximum solubilization of the inulin. The temperature of 65° C. temporarily prevents (2 h) the precipitation of inulin. The solution has a conductivity of 150 μS, a pH of 5.4, a temperature of 65° C. and a concentration of 30% dry matter content (DM). This solution is then passed through a safety filter in order to avoid mechanical impurities entering into the chromatographic system.

Figure 3:
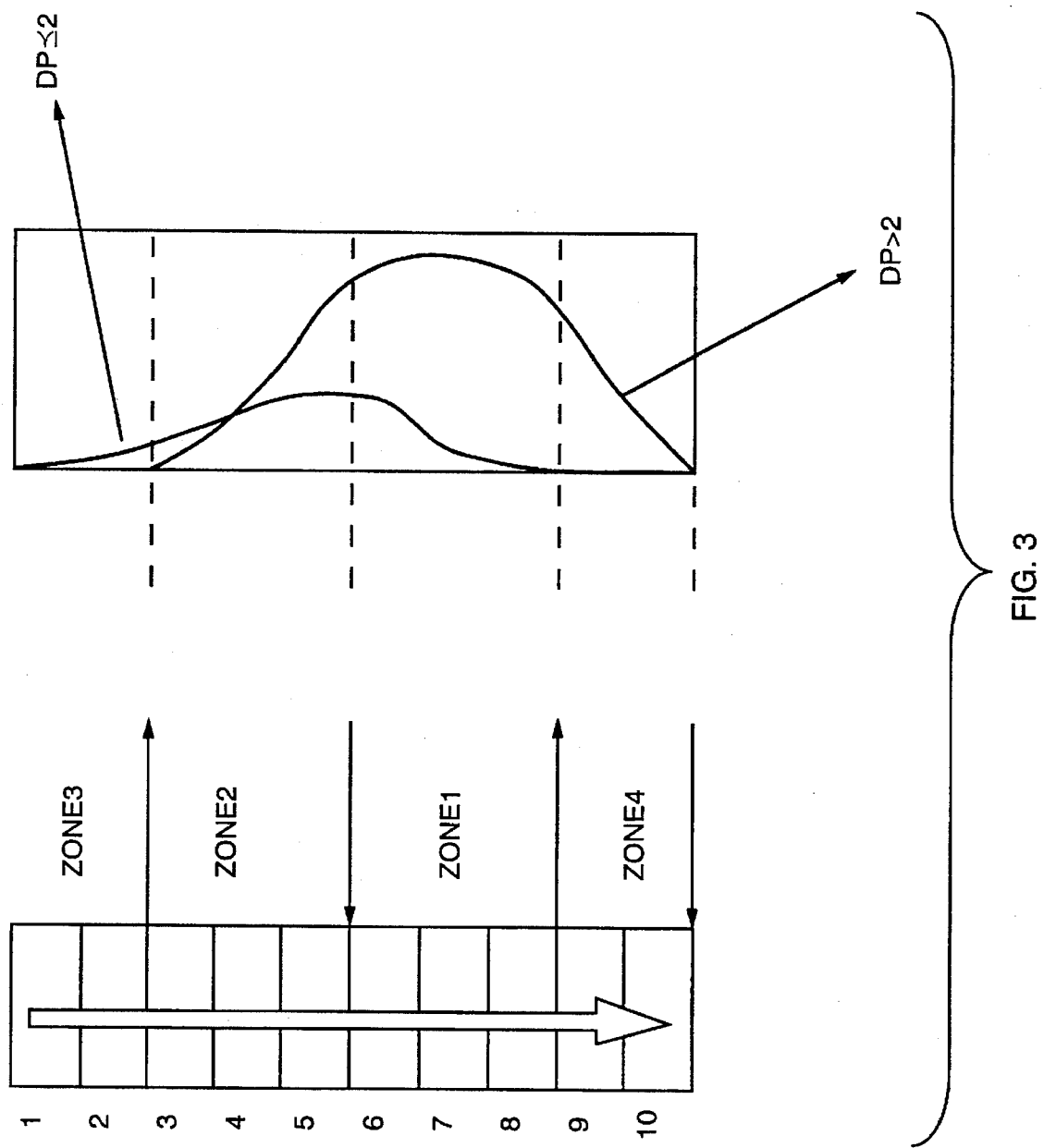

The chromatographic system used is a "continuous" type system, constructed by IWT (Illinois Water Treatment). It is an installation composed of a single column with an inner diameter of 150 cm, and a height of 10 m, divided into 10 sections and filled with an SM-49 resin of the styrene-divinylbenzene type in potassium form. The four separation zones (FIG. 3) are organized so that there are 3 sections in zone 1 between the point where the inulin penetrates into the column ("feed") and the point where the inulin freed of mono- and disaccharides ("raffinate") leaves the system, and so that there are also 3 sections in zone 2 between the "feed" and the point where the product containing, inter alia, mono- and disaccharides ("extract") leaves the column. The eluent ("desorbent") enters into the column 2 sections behind the exit of the "extract"; this zone is called zone 3. Zone 4 designates the 2 sections which are before the exit of the "raffinate".

The operational parameters of this IWT system are the following:

| Parameters | Value |
| --- | --- |
| FR/ZA | 600 1/h |
| FR/ZA | 0.108 |
| Z3/ZA | 1.300 |
| Z4/ZA | 0.800 |
| ST | 420 sec | with
FR = "feed rate" = flowrate of the inulin solution entering into the system in 1/h
ZA = the average flowrate in zones 1 and 2. It is in these two zones that the separation occurs
Z3 resp. Z4 = the flowrate in zone 3 resp. 4
ST = "step time".

It is the combination of all these parameters which makes it possible to obtain the abovementioned product.

Table 1 thus presents some characteristic results obtained.

TABLE I

| | FEED (Raftiline ST) | RAFFINATE (Raftiline LS) | EXTRACT |
| --- | --- | --- | --- |
| flowrate (1/h) | 600 | 1350 | 1800 |
| Dry matter (in g/100 g) | 30 | 10 | 2.5 |
| Temperature (°C.) | 75 | 65 | 65 |
| COMPOSITION | | | |
| Degree of polymerization 5+ | 82.7 | 92.5 | 21.0 |
| Degree of polymerization 4 | 4.6 | 4.8 | 2.0 |
| Degree of polymerization 3 | 3.8 | 2.3 | 8.4 |
| F3 | 0.3 | 0 | 2 |
| F2 | 0.3 | 0 | 2.4 |
| SUCROSE | 5.8 | 0.08 | 43.2 |
| GLUCOSE | 0.4 | 0 | 4.1 |
| FRUCTOSE | 2 | 0.3 | 17.1 |
| YIELD | — | 75% DM | 25% DM |

Example II: Production by "Batch" System

In a column with an internal diameter of 10 cm and a height of 12 m, filled with a chromatographic resin SM-48 styrene-divinylbenzene in potassium form, a solution of 2 liters at 30% DM of inulin is eluted with demineralized water at a flowrate of 300 ml/h. Some characteristic results of the different combined fractions are presented in Table 2.

TABLE 2

Characteristic results

|  | Fractions 1 & 2 | Fraction 3 | Fraction 4 | Fraction 5–15 |
|---|---|---|---|---|
| Fructose | 0.00% | 0.00% | 0.00% | 9.26% |
| Glucose | 0.00% | 0.00% | 0.00% | 0.00% |
| Sucrose | 0.00% | 2.02% | 15.86% | 39.81% |
| DFA | 0.00% | 0.00% | 0.00% | 0.00% |
| F2 | 0.00% | 0.00% | 0.00% | 0.00% |
| GF2 | 1.17% | 5.19% | 13.15% | 12.96% |
| F3 | 0.00% | 0.00% | 0.00% | 1.85% |
| GF3+ | 4.55% | 9.53% | 13.05% | 10.19% |

By combining fractions 1–4 in the "raffinate", a dry matter yield equivalent to that obtained in the IWT system is obtained.

Example III: Noncariogenicity

The cariogenic effect of a food product is determined with the aid of telemetric tests.

Series of telemetric tests were carried out on the product which is the subject of the present invention, at the Dental Institute of the University of Zurich according to the procedure developed by Dr T. Imfeld and published in Monographs in Oral Science, vol. 11, Karger, Basel, 1983. The fall in pH observed during the said test is a measure of the cariogenicity of the product.

A product is considered as being cariogenic if the pH falls below the value of 5.7.

Consumers are increasingly sensitive to the problem of dental caries and are looking for foods with little or no risks in this respect. In countries such as Switzerland, Germany, Austria, food products which successfully undergo this telemetric test are given a seal of the "toothfriendly" type.

The conditions for the test are the following:

|  | min |
|---|---|
| chewing of paraffin (1) | 3 |
| resting (2) | 4 |
| control (3) | 15 |
| rinsing with test solution 1 (4) | 2 |
| recall period (5) | 15 |
| rinsing with water (6) | 2 |
| chewing of paraffin (1) | 3 |
| resting (2) | 4 |
| rinsing with test solution 2 (4) | 2 |
| recall period (5) | 15 |
| rinsing with water (6) | 2 |
| chewing of paraffin (1) | 3 |
| resting (2) | 3 |
| rinsing with test solution 3 (4) | 2 |
| recall period (5) | 15 |
| rinsing with water (6) | 2 |
| chewing of paraffin (1) | 3 |
| resting (2) | 4 |
| rinsing with sucrose solution (11) | 2 |
| recall period (5) | 15 |
| rinsing with water (6) | 2 |
| chewing of paraffin (1) | 3 |
| resting (2) | 4 |

Test solution 1: 15 ml of an aqueous solution of 1.2 g of the product of the present invention containing 0.7% and of mono- and disaccharides.

Test solution 2: 15 ml of an aqueous solution of 1.2 g of a product containing 1.9% of mono- and disaccharides.

Test solution 3: 15 ml of an aqueous solution of 1.5 g of syrup of a product containing 5.4% of mono- and disaccharides.

Sucrose solution: 15 ml of an aqueous solution of 0.3 mol/liter.

Figure 4:
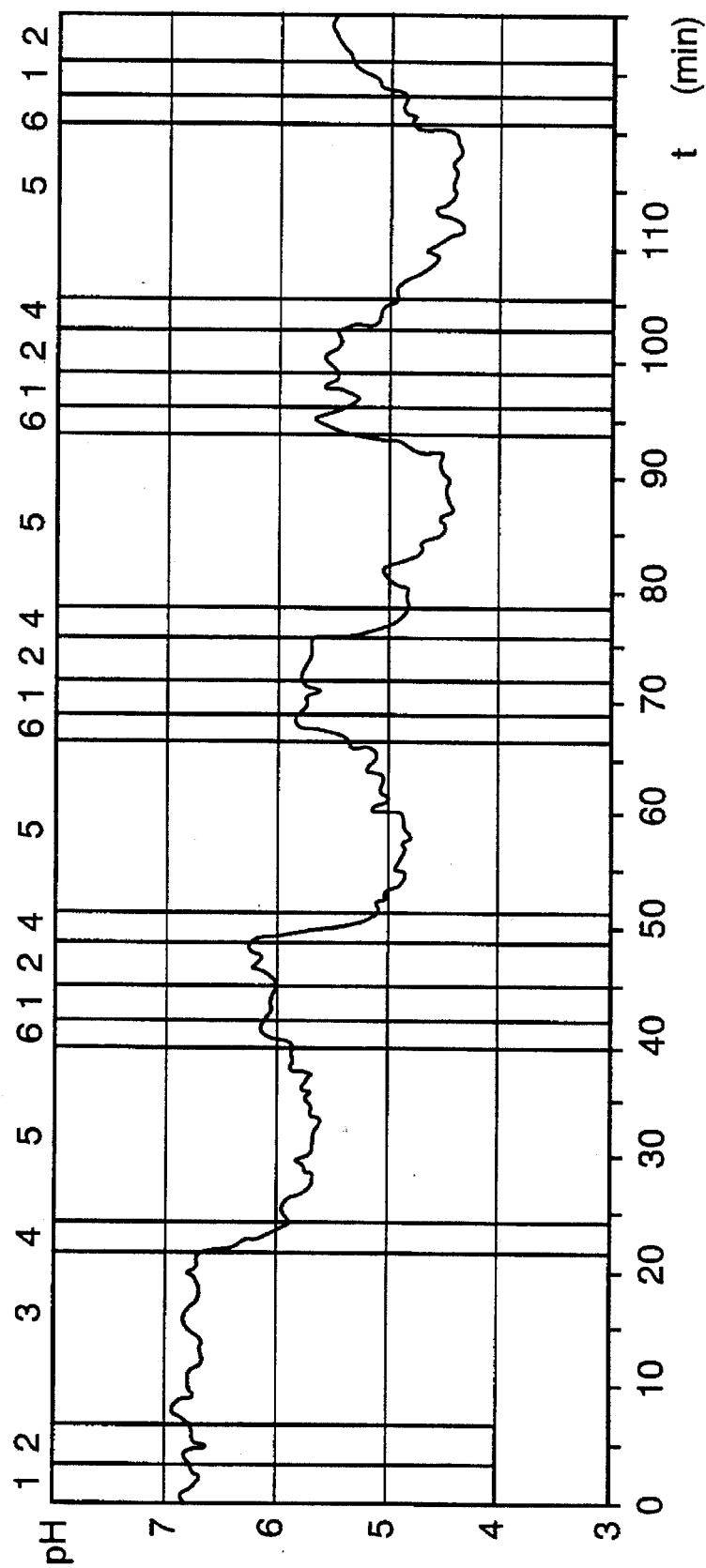

A first example of the results is illustrated in FIG. 4.

The production of acid and the parallel fall in interdental pH depend on the concentration of low molecular weight sugars present. The product which is the subject of the present invention is considerably less acidogenic.

Figure 5:
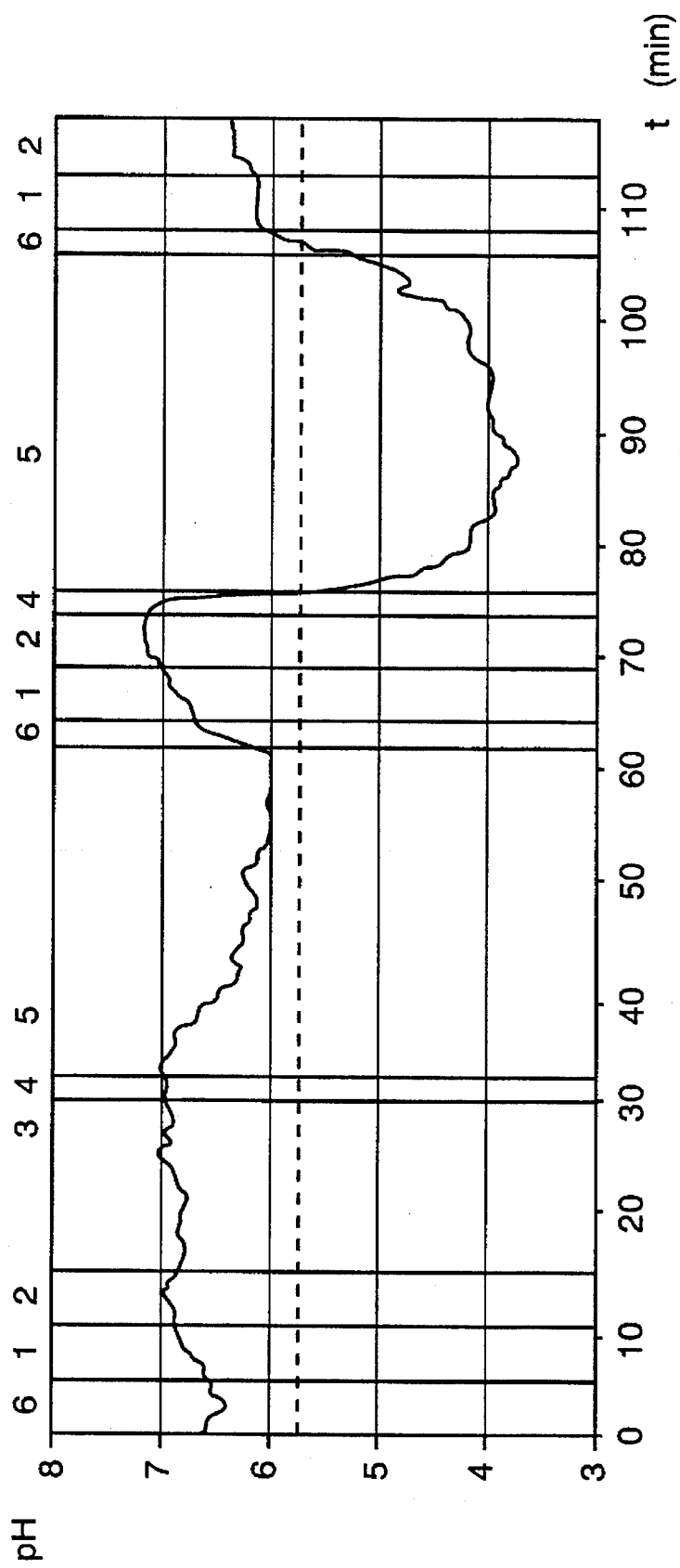

A second example of the results obtained is illustrated in FIG. 5.

The measurements are carried out according to the model which is described in the preceding example.

Test solution: 15 ml of an aqueous solution of 1.2 g of the product of the present invention containing less than 0.1% of mono- and disaccharides.

Sucrose solution: 15 ml of a 10% aqueous solution of sucrose.

The noncariogenicity of the product of the present invention containing less than 0.1% of mono- and disaccharides is clearly demonstrated in this test by the fact that the measured pH does not fall below the value of 5.7.

Example IV: Preparation of a Cream 250 ml of water at room temperature are poured into a 1 liter beaker and the Jenke and Kunkel Ultra-Turax T25 is placed in the beaker. 250 g of Raftiline LS® are added in small quantities so as to avoid the formation of lumps while causing the Ultra-Turax to rotate at full speed. After adding all the inulin, continue the mixing for 2 to 3 minutes. The cream already forms during this operation. The Raftiline® cream is white and opaque and has a fat-like structure with pseudoplastic characteristics. It has a thixotropic rheological behavior. The Raftiline LS® cream is stable and shows no decantation or flocculation phenomenon.

On changing the quantities of water and Raftiline LS® to 350 ml and 150 g, the Ultra-Turax should operate for at least 10 minutes after all the inulin has been added. The cream forms only after resting for 2 to 3 hours at room temperature and is less hard. The formation of the cream is accelerated by placing the beaker in the refrigerator.

On using boiling water, only the mixture of 50% Raftiline LS®-water forms a cream.

Other types of apparatus other than Ultra-Turax which also induce a shear effect can also be used, such as a mixer, homogenizer, "hydroshear", colloidal mill and the like. Ultrasound also produces a cream as described in Patent Application WO93/06744 in the name of Raffinerie Tirlemontoise.

On varying the specific parameters for a specific apparatus, the same differences in gel consistency as those described in the RT Rafticreming® patent are noted with, as difference, the fact that the Raftiline LS® creams have a higher gel consistency compared with those obtained starting with inulin of unmodified composition.

The gel consistency of an inulin cream of unmodified composition containing 40% dry matter content varies between 200 g and 240 g, as measured with the Stevens LFRA Texture Analyzer, whereas it varies between 240 g and 280 g in the case of a Raftiline LS® cream containing 40% dry matter content. Raftiline LS® immobilizes more water than inulin of unmodified composition, which has as consequence the fact that in order to obtain a defined gel consistency, less Raftiline LS® should be used than in the case of unmodified inulin.

The texture of a cream made with Raftiline LS® has the same fat-like structure as the cream made with inulin of unmodified composition.

The cream made with Raftiline LS® can replace up to 100% of fat in a whole series of food products and is preferably used in unsweetened food products.

Example V: Plain Spread

Raftiline LS® cream can be used to partially replace the oil and the fat in spreads with a low fat content. Thus, an excellent spread containing 20% of fat and 35% of Raftiline LS® cream (47%), instead of 80% of fat in butter, is easily produced without impairing the taste and the texture. The Raftiline LS® cream can also be produced in situ during the manufacture of the spread, as illustrated in the recipe below.

| Composition (% by weight) | |
| --- | --- |
| Phase A. | |
| Butter | 25.00 |
| Monoglycerides (Orffa type S) | 0.47 |
| Lecithin (Lucas Meyer Metaran P) | 0.20 |
| β-carotene (Roche 30% in oil) | 0.03 |
| Phase B | |
| Water | 38.70 |
| Raftiline LS ® | 35.00 |
| Salt | 0.50 |
| Potassium sorbate | 0.10 |
| Lactic acid | q.s. |

Process of Preparation

Phase A

Premix the powdered ingredients and incorporate them into the melted butter while adding the coloring. Store the fatty phase at 55° C.

Phase B

Add the other ingredients to water and adjust the pH to 5.0 with lactic acid. Mix until a homogeneous mass is obtained and store the aqueous mixture at 55° C.

Spread

Slowly incorporate, with vigorous stirring, the aqueous phase into the fatty dispersion (55° C.) Homogenize the product at 200 bar and rapidly cool to 12° C. Package in tubes and store in a refrigerator.

Example VI: Liver Sausage

Liver sausage is a typical example of meat products in which Raftiline LS® cream can be used to replace a portion of the fat, for example 60%, and to reduce the cholesterol level without sacrificing the texture and the mouth feel. In the following recipe, 30% of fat (total fat content) was replaced by 12% of fat and 9% of Raftiline LS® powder, or preferably 18% of Raftiline LS® cream (50%), which allows a calorie reduction of 50%.

| Composition (% by weight). | |
| --- | --- |
| Pork liver | 30.00 |
| Pork brain | 10.00 |
| Pork head | 35.50 |
| Pork cheek | 3.30 |
| Water | 9.80 |
| Mixture of spices | 0.60 |
| Nitrite salt | 1.80 |
| Raftiline LS ® | 9.00 |

Process of Preparation

The pork head and cheeks are placed in brine containing the salt and the nitrite. After leaving for 24 hours at 15° C., the meat as well as the brine and the Raftiline LS® are boiled for 90 minutes at 90° C. The stuffing is then prepared with the liver, the brain, the mixture of spices and the nitrite. The preparation of the emulsion is carried out in a 60 liter vacuum cooking bowl chopper. When Raftiline LS® cream is used, the latter is added at this stage. The emulsions are introduced into their casing immediately after their preparation and heated at 80° C. for 90 minutes. After cooling for 60 minutes, the sausages are stored at 2° C.

Example VII: Frankfurter

The Raftiline LS® can be used to replace a portion of the fat in a frankfurter. The Raftiline LS® offers such a sausage with reduced fat content, a texture and a mouth feel which are identical to those of a sausage with a normal fat content. In such a product, Raftiline LS® can be used in the form of a powder or of a cream. In the following recipe, the use of Raftiline LS® in the form of a cream makes it possible to reduce the fat content down to 11%.

| Composition (in % by weight) | |
| --- | --- |
| Pork meat (20% of fat) | 30.00 |
| Pork shoulder (50% of fat) | 10.00 |
| Water | 28.30 |
| Raftiline LS ® cream (50%) | 25.00 |
| Starch | 2.00 |
| Casein | 2.00 |
| Phosphate | 0.30 |
| Sodium nitrite | 1.30 |
| Ascorbic acid | 0.10 |
| Spices | 1.00 |

Process of Preparation

Add the salts and the water to the meat and grind the whole in a cutter until a homogeneous paste is obtained. Then add the Raftiline LS® cream, the casein and the starch and continue grinding until the desired texture is obtained. Package the product and subject it to the following heat treatment:

drying: 60° C., 30 minutes
smoking: 65° C., 35 minutes
cooking: 80° C., 30 minutes
cooling: 20° C., 5 minutes The sausages are stored at 4° C.

Example VIII: Hamburger-type Product

In a hamburger, it is possible to replace up to 30% of the meat with 30% of Raftiline LS® cream (50%). This represents an enrichment with dietary fibers, a calorie reduction and a reduction in production cost without impairing the taste and the texture. In the following recipe, 30% of the meat is replaced, which results in a calorie reduction of 25%.

| Composition (% by weight). | |
|---|---|
| Lean beef meat | 48.00 |
| High fat beef meat | 20.50 |
| Raftiline LS ® cream (50%) | 30.00 |
| Spices | 1.50 |

Process of Preparation

Grind the lean meat and the high fat meat and add the spices and the Raftiline LS® cream during the mixing. Introduce the meat into the appropriate form and store in a cool place.

Example IX: Gouda-type Cheese

Raftiline LS® can be used in amounts of 2–10% to reduce the fat content of all the varieties of cheeses such as harder cheeses (e.g. Gouda, Cheddar), semi-hard cheeses (e.g. St-Paulin, Munster), soft cheeses (e.g. Port-Salut, Brie, Camembert), whey cheeses, cheeses containing spices and flavorings of plant origin, cheeses treated by smoking and cheeses preserved in brine, in order to obtain a cheese with a low fat content containing 10–35% of fat on a dry matter basis with a texture and a mouth feel similar to a high fat cheese (containing more than 35% of fat on a dry matter basis and in general, more than 45% of fat on a dry matter basis). In the following recipe of a Gouda-type cheese, a fat reduction down to a content of 20% on a dry matter basis is obtained (reduction of 55% of fat).

| Composition (% by weight). | |
|---|---|
| Full-cream milk | 24.00 |
| Skimmed milk | 71.00 |
| Raftiline LS ® | 5.00 |
| β-carotene (or annatto) | q.s. |
| Rennet | q.s. |
| Lactic acid bacteria (starter) | 0.80 |
| calcium chloride | 0.02 |
| Sodium nitrate | 0.005 |

Process of Preparation

Mix the full-cream milk and the skimmed milk so as to obtain a milk containing 0.75% of fat. Add of the order of 5% Raftiline LS® to the milk and homogenize with the aid of a high-shear mixer until a homogeneous mixture is obtained. Pasteurize the milk at 75° C. and cool to 30° C. Add the β-carotene, rennet, starter, calcium chloride and sodium nitrate. The minimum renneting time is 30 minutes, after which the coagulum is removed with a ladle so as to leave the first whey. The curdled milk is washed with water and stirred, after which the second whey is removed. The next stages are the pressing, salting and ripening of the cheese.

Example X: Processed Cheese

By virtue of the use of Raftiline LS®, the processed cheeses have a texture and a mouth feel which are identical to those of a full-cream processed cheese. It is possible to obtain without any problem a processed cheese with a reduced fat content (10–35% of fat on a dry matter basis) using, as raw material, an appropriate quantity of high fat cheese and low fat cheese or low fat cheese alone and adding Raftiline LS® during the manufacture. Instead of low fat cheese, it is also possible to use, in this recipe, low fat curd or it is possible to use as raw material a cheese with a low fat content already containing Raftiline LS® as fat substitute as in Example IX. The following recipe makes it possible to obtain a processed cheese with a fat content of 10% on a dry matter basis.

| Composition (% by weight). | |
|---|---|
| Gouda containing 20% fat | 55.00 |
| Casein | 3.50 |
| Raftiline LS ® | 7.00 |
| Emulsifying salts | 3.00 |
| Water | 31.50 |

Process of Preparation

Chop the cheese and introduce the pieces into a cutter with casein, Raftiline LS®, emulsifying salts and water. Increase the temperature to 85° C. and mix the whole (1500 rpm) until a homogeneous molten mass is obtained which will then be cast and stored in a cool place.

We claim:

1. Process for the chromatographic separation of a polydispersed composition of saccharides comprising
   dissolving said polydispersed composition into solution,
   forming a metastable solution by adjusting the temperature of said solution to a temperature less than the solubilization temperature without agglomerating,
   introducing said metastable solution into a chromatographic column and eluting and separating said composition into different fractions according to their degree of polymerization.

2. Separation process according to claim 1 wherein prior to chromatographic separation, the composition is dissolved by heating or by subjecting it to the action of ultrasound and/or to shear forces sufficient to break the tertiary structure of said saccharides.

3. Separation process according to claim 1 wherein the polydispersed composition of saccharides is chosen from the group consisting of inulin, levan, dextran, starch, pectin and/or a mixture thereof.

4. Separation process according to claim 1, wherein the polydispersed composition of saccharides is eluted with water having a temperature of between 5° and 95° C., preferably of between 65° and 75° C.

5. Separation process according to claim 1, wherein the polydispersed composition of saccharides is eluted with water having a conductivity of between 1 µS and 100 mS, preferably of between 10 and 250 µS.

6. Separation process according to claim 1, wherein the polydispersed composition of saccharides is eluted with water having a pH of between 4 and 8, preferably of between 5.5 and 7.

7. Separation process according to claim 1, wherein the chromatographic column contains cationic resins.

8. Separation process according to claim 7, wherein the grains of cationic resins of the chromatographic column are between 10 µm and 2 mm, preferably of between 100 µm and 500 µm.

9. Separation process according to claim 1, wherein the chromatographic column contains zeolites.

10. Polydispersed composition of saccharides free of saccharides with a degree of polymerization of less than or equal to 2 obtained by the process of claim 1.

11. Composition having a creamy structure and comprising the polydispersed composition of saccharides according to claim 10 and a liquid.

12. Food product comprising a higher percentage of water or a preparation intended for the manufacture of the said food product which comprises, in addition to the customary food components, the composition according to claim 11.

13. Food product according to claim 12, which is chocolate.

14. Food product or a preparation intended for the manufacture of a food product, which comprises a composition according to claim 10.

15. Food product or a preparation intended for the manufacture of the said food product, which comprises, in addition to the customary food components, the composition of claim 10, as partial or total fat substitute, as carbohydrate substitute or as stabilizer.

16. Inulin composition of saccharides free of monosaccharides and disaccharides obtained by the process of claim 1.

17. Composition having a creamy structure and comprising the polydispersed composition of saccharides according to claim 16 and a liquid.

18. Food product or a preparation intended for the manufacture of the said food product which comprises, in addition to the customary food components, the composition of claim 16, as partial or total fat substitute, as carbohydrate substitute or as stabilizer.

19. Polydispersed composition of saccharides free of saccharides with a degree of polymerization greater than 5 and which is obtained by the process according to claim 1.

20. Food product or a preparation intended for the manufacture of a food product, which comprises a composition according to claim 19.

21. Polydispersed composition of saccharides free of saccharides with a degree of polymerization of less than or equal 5 obtained by the process of claim 1.

22. Inulin composition substantially free of saccharides with a degree of polymerization of less than or equal to 5 obtained by the process of claim 1.

* * * * *

UNITED STATES PATENT AND TRADEMARK OFFICE
CERTIFICATE OF CORRECTION

PATENT NO. : 5,660,872
DATED : August 26, 1997
INVENTOR(S) : Jan Van Loo, Karl Booten, Georges Smits It is certified that error appears in the above-identified patent and that said Letters Patent is hereby corrected as shown below:

Claim 21, Col. 20, line 14, after "equal" insert --to--.

Signed and Sealed this

Fifteenth Day of September, 1998

Attest:

BRUCE LEHMAN

*Attesting Officer*  Commissioner of Patents and Trademarks